Figure 1:
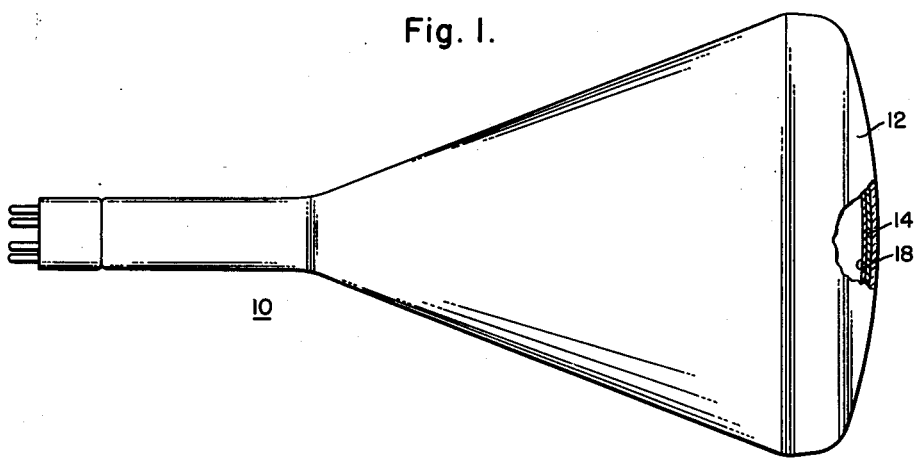

Oct. 28, 1952     J. W. COLTMAN     2,616,057

BLACK SCREEN TELEVISION CATHODE-RAY TUBE

Filed May 20, 1950

WITNESSES:

INVENTOR
John W. Coltman.

Patented Oct. 28, 1952

2,616,057

UNITED STATES PATENT OFFICE 2,616,057

BLACK SCREEN TELEVISION CATHODE-RAY TUBE

John W. Coltman, Pittsburgh, Pa., assignor to Westinghouse Electric Corporation, East Pittsburgh, Pa., a corporation of Pennsylvania Application May 20, 1950, Serial No. 163,121

13 Claims. (Cl. 313—92)

My invention relates to fluorescent screens and in particular to fluorescent screens for use with cathode ray tube apparatus.

A cathode ray tube having a fluorescent screen, which is characterized by providing a high contrast, that is a high ratio of brightnesses of the light and dark areas on the tube's fluorescent screen when viewed from a position external to the tube, is highly desirable, especially for use in television receivers.

In accordance with the prior art of which I am aware, ambient illumination, that is, illumination striking the external side of the fluorescent screen from light sources outside the cathode ray tube, has a tendency to impair high image contrast by increasing the apparent brightness of the dark areas. Image contrast is also impaired by the introduction of halation effects due to internal light reflections between the respective surfaces of the glass tube face, and by diffused reflection and scattering of light rays in the screen material to illuminate an area surrounding the spot excited by the electron beam. In an effort to overcome the first objectionable characteristic, dark and slightly opaque light filters have been placed over the tube face to reduce light falling on the tube face from external light sources. Such dark filters, however, also reduce considerably the desirable light which comes from the image on the screen and necessitate the sacrifice of considerable image brightness. Another attempt to overcome these objectionable characteristics has been to place a dark material in the glass of the tube face itself, but this approach is also subject to considerable objections of a similar nature.

It is an object of my invention to provide an improved fluorescent screen for cathode ray tubes.

It is another object of my invention to improve the contrast ratio of fluorescent screens.

It is another object of my invention to improve the contrast ratio of the screen when said screen is exposed to ambient illumination.

It is a further object of my invention to substantially eliminate halation effect of light reflected within the tube face.

Still another object of my invention is to provide a dark face fluorescent screen cathode ray tube which requires no external light filtering apparatus.

An additional object of my invention is to provide a better contrast ratio for the fluorescent screen and at the same time require no external light filters or light absorbent materials between the fluorescent screen and the observers.

A still additional object is to provide an improved method for making fluorescent screens for cathode ray tubes.

Another object of my invention is to provide a method of manufacturing a fluorescent screen which is characterized by a desirable contrast ratio under conditions of ambient illumination.

In accordance with my invention a phosphor layer is placed on the internal surface of the cathode ray tube face, said phosphor layer being in the form of a transparent thin glassy layer which is characterized by a structure which does not substantially diffuse light that impinges upon it.

In the following, the words "transparent" and "glassy" as applied to the phosphor layer are used to describe the substantially non-diffusing character of the layer with respect to light rays, although the material of the layer may have an organized crystalline structure in the chemical sense. A light absorbent coating is subsequently placed on the inner surface of said phosphor layer away from said tube face. This coating is of a thickness which does not impair the operation of the cathode ray tube electron beam to excite the fluorescent layer, however, this coating is of such thickness that ambient illumination from light sources external to the cathode ray tube is substantially absorbed and not reflected back in a direction generally toward the external light sources. The light absorbent coating can be made of some material such as carbon deposited as lampblack, or by evaporating certain materials, such as aluminum or antimony, for example, in a low pressure atmosphere. Under these conditions black deposits rather than metallic appearing deposits, are obtained. The presence of the relatively thin light absorbent black layer on the back side of the transparent phosphor layer gives the appearance, when viewed from the external, or front, side of the cathode ray tube face, of a substantially black screen.

The novel features that I consider characteristic of my invention are set forth with particularity in the appended claims. The invention itself, however, both as to its organization and its method of operation, together with additional objects and advantages thereof will best be understood from the following description of specific embodiments when read in conjunction with the accompanying drawing, in which:

Figure 1 of the drawing illustrates a cathode ray tube having a thin glassy layer of phosphor material deposited on the internal side of the tube face and a black light absorbent coating deposited on the internal surface of said phosphor layer.

Figure 2:
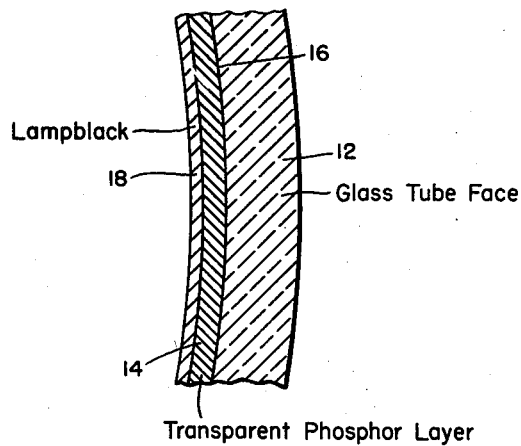

Figure 2 of the drawing is a sectional view of the cathode ray tube screen showing the glass tube face, the glassy layer of phosphor and the black coating placed on said phosphor layer.

The cathode ray tube 10 shown in Fig. 1 is presumed to have an electron gun for generating an electron beam, means for modulating the intensity of the beam, deflection control means such as electrostatic deflection plates or magnetic deflection coils, a first accelerating anode, a second anode, and a tube face 12. On the internal surface of said tube face 12 is deposited a thin glassy layer of phosphor material to form a transparent fluorescent screen. On the internal surface of said phosphor layer is deposited a coating of light absorbent material.

The section of the tube face 12 shown in Fig. 2 includes a phosphor layer 14 deposited on the internal surface 16 of the tube face 12 which layer is in the form of a transparent glassy layer and is characterized by a substantially non-diffusing structure. A method for depositing such a phosphor layer 14 to form a fluorescent screen is described in United States Patent 1,954,691, to de Boer and Dippel. In accordance with the teachings of the latter patent, the fluorescent material is volatilized and precipitated in a vacuum to form a uniform layer 14 on the tube face 12 of such a thickness that it is substantially transparent to light rays.

The relatively thin light absorbent coating 18 which is applied to the surface of the abovedescribed phosphor layer 12 must be of such a thickness that the electron beam coming from the direction of the electron gun can pass through the light absorbent coating 18 and excite the phosphor layer 14 without too great an energy loss. Such a layer or coating 18 can be made from carbon in a simple manner by depositing it as lampblack from a source such as an acetylene flame. Another method of forming such a coating 18 would be the evaporation of certain light absorbent materials, such as aluminum or antimony, in a low pressure atmosphere, to form a black non-reflective coating. Such layers can readily be made thin enough to cause little loss of energy of the electrons passing through them at velocities corresponding to voltages commonly used in television cathode ray tubes, and still be substantially opaque to light.

In the section view of the cathode ray tube screen shown in Fig. 2, the phosphor layer 14 is shown contiguous to the tube face 12. And contiguous to the inner surface of such phosphor layer 14 is the thin coating 18 of non-reflecting light absorbent material.

The phosphor layer 14 which is precipitated and deposited on the inner tube face surface 16 is of a substantially non-diffusing and homogeneous structure. Thus, there are no individual crystals to reflect undesired light which falls on the screen. This is beneficial in the reduction of halation effects which are detrimental to picture detail contrast. Halation occurs when light is reflected internally from the glass surface of the tube face 12, which in prior art devices illuminates the phosphor screen and surrounds the spot energized by the electron beam with a luminous halo. This is objectionable in that it causes those black areas of the screen image which are near bright areas to appear grayish in color. This is particularly objectionable in television receiver tubes.

My invention overcomes this halation effect and provides greater detail contrast in that both the non-diffusing fluorescent screen 14 and the contiguous black layer coating 18 on the back side of said screen are non-reflecting. Therefore, the internal reflections between the glass tube face 12 surfaces do not light up the phosphor screen 14 as in prior art tubes. Any specular internal reflection between the surfaces of the tube face 12 due to a difference in refractive index of the tube face 12 and layer 14 will further not be objectionable in that this light will, in general, be trapped within the tube face 12 since the reflection angles are such that the major portion of the light cannot escape through the surfaces of the tube face 12.

Since the black coating 18 is behind the phosphor layer 14, there is relatively little absorption of desirable light from the fluorescent screen, so that high contrast ratios can be obtained. This is of particular importance respecting deep black portions of the image on the screen. Also, the non-cyystalline structure of the glassy phosphor layer 14 is of importance in that there are no crystals to reflect light from sources external to the tube, and in this manner, the black areas of the image on the screen are not impaired by reflections of external light on the phosphor crystals themselves.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination: a cathode ray tube having a tube face and electrodes for producing an electron beam; a fluorescent layer precipitated on the internal side of said tube face to form a transparent glassy layer thereon; and a coating of light absorbent material, of such thickness that the operation of said electron beam is not impaired, adjacent said fluorescent layer on the opposite side of said fluorescent layer from said tube face.

2. In combination: a television receiver tube having a tube face and electrodes for producing an electron beam, a layer of fluorescent material on the internal side of said tube face, and a layer of light absorbent material, respecting incident light rays, adjacent said fluorescent layer on the opposite side of said fluorescent layer from said tube face, said layer of light absorbent material being of such thickness that the operation of said electron beam to excite said fluorescent layer is not impaired.

3. A fluorescent screen on a television tube face, comprising the combination of a phosphor layer on said tube face, said layer characterized by a substantially non-diffusing structure, and a coating of light absorbent lampblack on said phosphor layer.

4. A screen for a television tube having a tube face, comprising the combination of a fluorescent glassy layer on said tube face, and a coating of light absorbent material on said layer.

5. A screen for use with a television tube having a tube face, comprising the combination of an excitable phosphor layer precipitated on said tube face in the form of a substantially non-diffusing structure, and a second layer of light absorbent material, respecting light rays passing through said phosphor layer, near said phosphor layer on the opposite side from that on which said tube face is located, so as to absorb light reflected from said phosphor layer.

6. In a screen for a television tube having a tube face, the combination of a fluorescent glassy layer on said tube face, and a coating of light absorbent material on the surface of said layer away from said tube face.

7. In a screen for a television tube having a tube face and electrodes for producing an electron beam for exciting said screen, the combination of a fluorescent layer on said tube face, and a coating of light absorbent material on said layer, said coating being of such thickness that the operation of said beam impinging on said layer is not impaired.

8. In a screen for a television tube having a tube face and electrodes for producing an electron beam for exciting said screen, the combination of a first layer of fluorescent material on the internal surface of said tube face, and a second layer of light absorbent material on the internal surface of said first layer away from said tube face, said second layer being of such a thickness that the operation of said electron beam respecting said first layer is not impaired.

9. The combination as claimed in claim 8 and in which said first layer is of a phosphor material, and said second layer is made of lampblack.

10. In combination, a cathode-ray tube having a tube face and means for directing an electron beam at said tube face, a fluorescent screen precipitated on the internal side of said tube face to form a transparent layer thereon, and a light absorbent layer, having a reflectance of less than 30% and of such thickness that the operation of said electron beam is not impaired, coated on said transparent layer on the opposite side thereof from said tube face.

11. In combination, a cathode ray tube having electrodes for producing an electron beam, and a screen disposed in the path of said beam, said screen comprising a transparent supporting material, a fluorescent layer precipitated on the internal side of said transparent material to form a transparent glassy layer thereon, and a coating of light absorbent material adjacent said fluorescent layer and of such thickness that the operation of said electron beam is not impaired, said coating being on the opposite side of said fluorescent layer from said supporting material.

12. A screen for a television tubing comprising: a transparent supporting layer, a fluorescent glassy layer on said supporting layer, and a coating of light absorbent material on said fluorescent layer.

13. A screen for a television tube comprising: a transparent supporting material, a fluorescent glassy layer on said material, and a coating of light absorbent material on the surface of said layer away from said supporting material.

JOHN W. COLTMAN.

REFERENCES CITED

The following references are of record in the file of this patent:

UNITED STATES PATENTS

| Number | Name | Date |
|---|---|---|
| 1,954,691 | De Boer et al. | Apr. 10, 1934 |
| 1,982,373 | Clinker et al | Nov. 27, 1934 |
| 2,093,699 | Varian et al. | Sept. 21, 1937 |
| 2,088,595 | Hartmann | Aug. 3, 1937 |
| 2,090,922 | Von Ardenne | Aug. 24, 1937 |
| 2,146,573 | Hartmann | Feb. 7, 1939 |
| 2,226,567 | Le Van | Dec. 31, 1940 |
| 2,312,206 | Calbick | Feb. 23, 1941 |
| 2,244,245 | Ehrenberg | June 3, 1941 |
| 2,233,786 | Law | Mar. 4, 1941 |
| 2,240,706 | Law | May 6, 1941 |
| 2,412,654 | Sadowsky | Dec. 17, 1946 |
| 2,446,248 | Shrader | Aug. 3, 1948 |
| 2,485,561 | Burroughs | Oct. 25, 1949 |
| 2,543,477 | Sziklai | Feb. 27, 1951 |
| 2,554,017 | Dalton | May 22, 1951 |

OTHER REFERENCES

Pfund—Review of Scien. Instruments vol. I, July 1930 pgs. 397–399.